(12) United States Patent
Himmelmann

(10) Patent No.: US 11,486,498 B1
(45) Date of Patent: Nov. 1, 2022

(54) DYNAMIC SEALING LABYRINTH SEALS

(71) Applicant: Hamilton Sundstrand Corporation, Charlotte, NC (US)

(72) Inventor: Richard A. Himmelmann, Beloit, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/471,801

(22) Filed: Sep. 10, 2021

(51) Int. Cl.
*F16J 15/447* (2006.01)
*F04D 29/08* (2006.01)
*F16J 15/16* (2006.01)

(52) U.S. Cl.
CPC .......... *F16J 15/447* (2013.01); *F04D 29/083* (2013.01); *F16J 15/164* (2013.01); *F05D 2240/11* (2013.01); *F05D 2240/55* (2013.01)

(58) Field of Classification Search
CPC ...... F16J 15/447; F16J 15/164; F04D 29/083; F04D 29/08; F04D 29/16; F04D 29/161; F01D 11/02; F05D 2240/11; F05D 2240/55
USPC ............................... 415/173.5, 174.5, 173.6
See application file for complete search history.

(56) References Cited

U.S. PATENT DOCUMENTS

| 2,851,289 | A | * | 9/1958 | Haakon | F04D 29/167 415/197 |
|---|---|---|---|---|---|
| 3,512,788 | A | * | 5/1970 | Kilbane | F04D 29/167 415/206 |
| 4,152,092 | A | * | 5/1979 | Swearingen | F01D 11/02 277/423 |
| 4,245,952 | A | * | 1/1981 | Eberhardt | F04D 29/426 415/196 |
| 4,472,107 | A | * | 9/1984 | Chang | F04D 29/0513 415/170.1 |
| 4,867,638 | A | * | 9/1989 | Handtmann | F16J 15/44 415/217.1 |
| 4,909,706 | A | * | 3/1990 | Bergsten | F01D 11/025 285/321 |
| 4,948,336 | A | * | 8/1990 | Mosure | F04D 29/167 277/411 |
| 5,014,999 | A | | 5/1991 | Makhobey | |
| 5,873,697 | A | * | 2/1999 | Gully | F04D 29/167 29/888.021 |
| 6,039,535 | A | * | 3/2000 | Kobayashi | F04D 29/102 415/230 |
| 6,155,780 | A | * | 12/2000 | Rouse | F01D 11/18 415/173.6 |
| 6,234,748 | B1 | * | 5/2001 | Brown | F04D 29/047 415/170.1 |
| 7,338,255 | B2 | * | 3/2008 | Nabesaka | F04D 1/063 415/171.1 |

(Continued)

FOREIGN PATENT DOCUMENTS

CN 112879339 A 6/2021

Primary Examiner — Courtney D Heinle
Assistant Examiner — Ryan C Clark
(74) Attorney, Agent, or Firm — Cantor Colburn LLP

(57) ABSTRACT

A compression ring for a shrouded compressor including a radially inner surface having one or more areas configured to mate flush with one or more portions of a radially outward surface of a shroud of the shrouded compressor, a radially outer surface located opposite the radially inner surface, a labyrinth seal located on the radially outer surface, a groove located within the radially inner surface, and a load ring located within the groove.

20 Claims, 6 Drawing Sheets

(56) References Cited

U.S. PATENT DOCUMENTS

| | | |
|---|---|---|
| 8,191,571 B2 | 6/2012 | Himmelmann et al. |
| 9,181,817 B2 | 11/2015 | Deo et al. |
| 9,447,793 B2* | 9/2016 | Korupp ................. F04D 29/026 |
| 2013/0164119 A1 | 6/2013 | Nakaniwa |
| 2016/0097293 A1* | 4/2016 | Svihla .................... F16J 15/447 |
| | | 277/424 |

* cited by examiner

DYNAMIC SEALING LABYRINTH SEALS

BACKGROUND

The embodiments herein generally relate to electrical power generation systems and more specifically, a dynamic sealing labyrinth seal for use in the electrical power generation systems.

Some systems, such as unmanned aerial vehicles (UAV's) or the like often utilize electrical power for propulsion and operation of onboard systems. Some such systems, such as medium-sized UAV's that require power levels in the range of about 1 KW to 30 KW, have relatively short mission times because the energy density of batteries is far too low to effectively work in this power range, and conventional internal combustion engines and jet engines are very inefficient at these low power levels. One option that has been developed is a tethered UAV system in which the UAV is connected to a power source on the ground by a tether. Use of a tethered UAV allows for an increase in mission duration time, but reduces an operating height and distance in which the UAV may operate, due to the constraint of the tether. An untethered efficient power source that is lightweight with a high power density is greatly desired

BRIEF SUMMARY

According to one embodiment, a compression ring for a shrouded compressor is provided. The compression ring including a radially inner surface having one or more areas configured to mate flush with one or more portions of a radially outward surface of a shroud of the shrouded compressor, a radially outer surface located opposite the radially inner surface, a labyrinth seal located on the radially outer surface, a groove located within the radially inner surface, and a load ring located within the groove.

In addition to one or more of the features described above, or as an alternative, further embodiments may include that the compression ring has a first density and the load ring has a second density that is greater than the first density.

In addition to one or more of the features described above, or as an alternative, further embodiments may include that the groove and the load ring are located radially inward of the labyrinth seal.

In addition to one or more of the features described above, or as an alternative, further embodiments may include that the compression ring is composed of three sections including a first section, a second section, and a third section located between the first section and the second section. The labyrinth seal, the groove, and the load ring are located within the first section.

In addition to one or more of the features described above, or as an alternative, further embodiments may include that the first section has a first average thickness and the third section has a third average thickness. The first average thickness is less than the third average thickness.

According to another embodiment, a compressor assembly is provided. the compressor assembly including a compressor including a central shaft including an external surface, and a shroud extending circumferentially around the central shaft. The shroud including a radially inward surface and a radially outward surface located opposite the radially inward surface. The external surface of the central shaft and the radially inward surface of the shroud are in a facing spaced relationship forming a core flow path therebetween. The compressor also includes a plurality of blades extending from the central shaft to the shroud. The compressor assembly includes a compression ring extending circumferentially around the shroud. The compression ring includes a radially inner surface, a radially outer surface located opposite the radially inner surface, a labyrinth seal located on the radially outer surface, a groove located within the radially inner surface, and a load ring located within the groove.

In addition to one or more of the features described above, or as an alternative, further embodiments may include that the compression ring has a first density and the load ring has a second density that is greater than the first density.

In addition to one or more of the features described above, or as an alternative, further embodiments may include that the groove and the load ring are located radially inward of the labyrinth seal.

In addition to one or more of the features described above, or as an alternative, further embodiments may include that the compression ring is composed of three sections including a first section, a second section, and a third section located between the first section and the second section. The labyrinth seal, the groove, and the load ring are located within the first section.

In addition to one or more of the features described above, or as an alternative, further embodiments may include that the first section has a first average thickness and the third section has a third average thickness, and wherein the first average thickness is less than the third average thickness.

In addition to one or more of the features described above, or as an alternative, further embodiments may include that the third section is in contact with the compressor and the first section is not in contact with the compressor.

In addition to one or more of the features described above, or as an alternative, further embodiments may include that the compression ring is in an interference fit with the shroud and that the compression ring is configured to apply a radially inward compressive force along one or more portions of the radially outward surface of the shroud. The radially inward compressive force is configured to compress the shroud and the plurality of blades into the central shaft.

In addition to one or more of the features described above, or as an alternative, further embodiments may include that the compressor has a first tensile strength, and wherein the compression ring has a second tensile strength that is greater than the first tensile strength.

According to another embodiment, an electrical power generation system is provided. The electrical power generation system including a frame, a labyrinth seal mating ring operably attached to the frame, and a micro-turbine alternator. The micro-turbine alternator including a combustion chamber, at least one turbine driven by combustion gases from the combustion chamber, a compressor operably connected to the combustion chamber to provide a compressed airflow thereto, one or more shafts connecting the at least one turbine to the compressor such that rotation of the at least one turbine drives rotation of the first stage compressor and the second stage compressor, and an electric generator disposed along the one or more shafts such that electrical power is generated via rotation of the one or more shafts. The compressor includes a central shaft including an external surface and a shroud extending circumferentially around the central shaft. The shroud including a radially inward surface and a radially outward surface located opposite the radially inward surface. The external surface of the central shaft and the radially inward surface of the shroud are in a facing spaced relationship forming a core flow path therebetween. The compressor also includes a plurality of blades extending from the central shaft to the shroud and a compression ring extending circumferentially around the shroud.

The compression ring including a radially inner surface, a radially outer surface located opposite the radially inner surface, a labyrinth seal located on the radially outer surface, the labyrinth seal being in a facing spaced relationship with the labyrinth seal mating ring defining a radial gap therebetween, a groove located within the radially inner surface, and a load ring located within the groove. The labyrinth seal is configured reduce the radial gap, using a centrifugal force generated by the load ring as a rotational speed of the compressor assembly increases.

In addition to one or more of the features described above, or as an alternative, further embodiments may include that the compression ring has a first density and the load ring has a second density that is greater than the first density.

In addition to one or more of the features described above, or as an alternative, further embodiments may include that the groove and the load ring are located radially inward of the labyrinth seal.

In addition to one or more of the features described above, or as an alternative, further embodiments may include that the compression ring is composed of three sections including a first section, a second section, and a third section located between the first section and the second section. The labyrinth seal, the groove, and the load ring are located within the first section.

In addition to one or more of the features described above, or as an alternative, further embodiments may include that the first section has a first average thickness and the third section has a third average thickness, and wherein the first average thickness is less than the third average thickness.

In addition to one or more of the features described above, or as an alternative, further embodiments may include that the third section is in contact with the compressor and the first section is not in contact with the compressor.

In addition to one or more of the features described above, or as an alternative, further embodiments may include that the compression ring is in an interference fit with the shroud. The compression ring is configured to apply a radially inward compressive force along one or more portions of the radially outward surface of the shroud, the radially inward compressive force is configured to compress the shroud and the plurality of blades into the central shaft.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

As previously noted, an untethered, lightweight, high power density power source would allow systems like UAVs to have longer mission times without the height and distance limits of a tether. An approach to power generation involves micro-turbine alternator design utilizing an electric generator in combination with a compressor, turbine, and combustion chamber. The efficiency of the micro-turbine alternator is often largely dependent on the compressor design.

Some compressor designs utilize an open impeller. An open impeller may be defined as an impeller without a shroud. Open impellers may often be used to facilitate the manufacturing process, as it allows the impeller to be machined with standard cutting tools. A centrifugal compressor's efficiency is highly dependent on the tip leakage flow rate. The compressor's tip leakage flow rate is dependent on the distance between the impeller blade tips and the inside of the stationary housing. This is referred to as the tip gap. One method to eliminate a compressor's tip leakage is to build the impeller with a shroud, which may be referred to as a shrouded impeller. A shrouded impeller may be built using an additive manufacturing method, such as, for example, 3D printing. Shrouded impellers built through additive manufacturing have a lower tensile strength than shrouded impellers built through a subtractive machining method. As the shrouded impeller rotates, the shrouded impeller experiences a large centrifugal force that causes the shrouded impeller to try to expand in the radial direction, which applies tensile stress to the impeller blades. This tensile stress that is applied to impeller blades may exceed the material strength of the additive manufactured material. Embodiments disclosed herein seek to significantly reduce the operational impeller blade stresses associated with implementing a shroud on a high-speed centrifugal compressor by installing a stress relieving compressor shroud compression ring over the outside of the compressor impeller encircling the impeller blades.

Further, shrouded impellers are still required to deal with leaking between the rotating shrouded impeller and a stationary frame surrounding the shrouded impeller. Labyrinth seals may be utilized to seal and prevent leakage between the rotating shrouded impeller and the stationary frame. Embodiments disclosed herein seek to improve the performance of these labyrinth seals using centrifugal force from a load that expands the labyrinth seal into the stationary frame when the shrouded impeller rotates.

Figure 1:
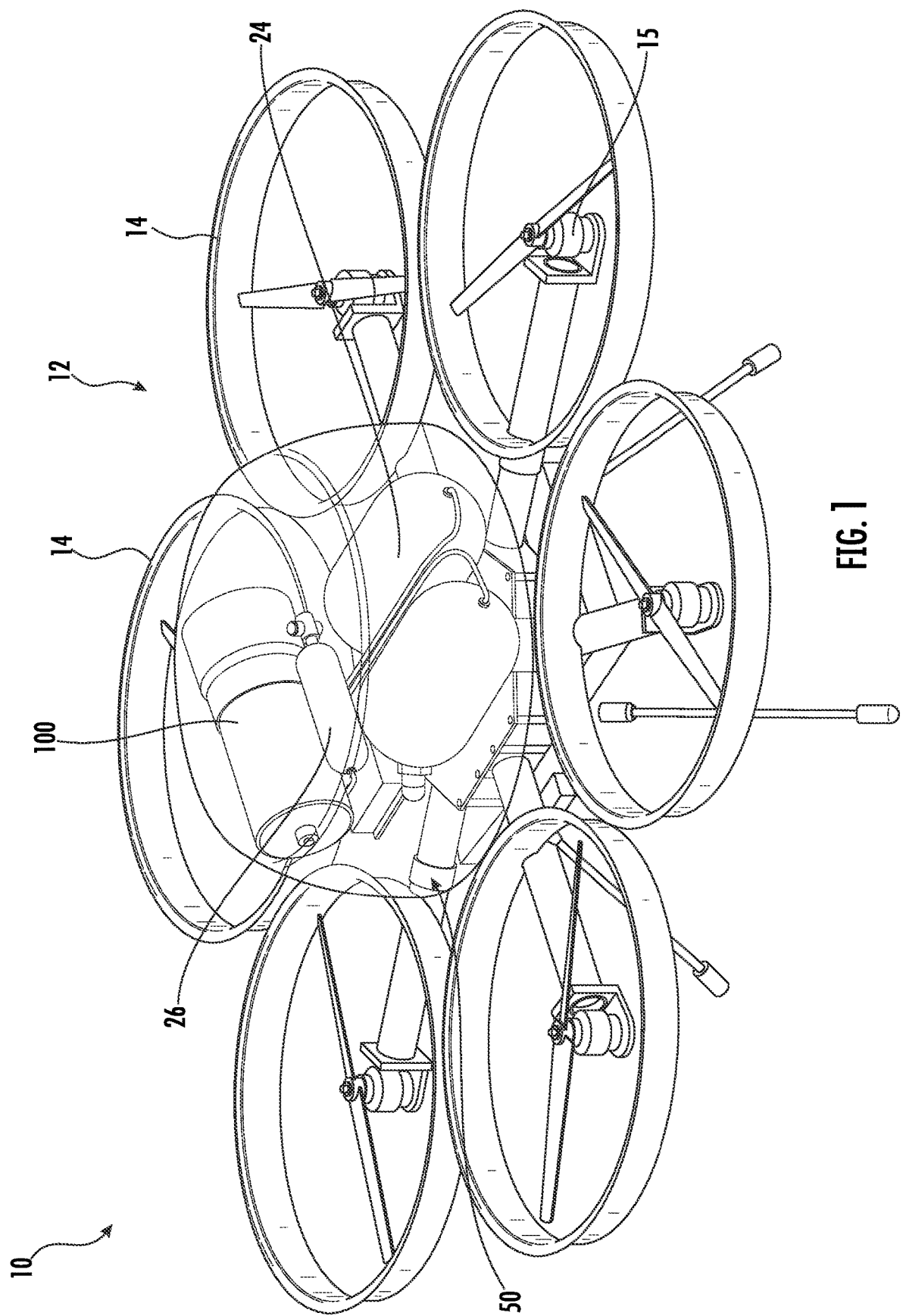
FIG. 1 is an isometric view of an unmanned aerial vehicle including a power generation system, according to an embodiment of the present disclosure.

Referring to FIG. 1, an isometric view of an unmanned aerial vehicle (UAV) 10 is illustrated in accordance with an embodiment of the present disclosure. The UAV 10 includes a propulsion/lift system 12, for example a plurality of lift rotors 14, operably connected to an electrical power generation system 50, which includes a micro-turbine alternator system 100. In an embodiment, the micro-turbine alternator system 100 is a high efficiency Brayton cycle micro-turbine alternator. The UAV 10 includes a propulsion system having electric motors 15 and lift rotors 14 associated with each electric motor 15. Each lift rotor 14 is operably connected to the electric motor 15 that is configured to rotate the lift rotor 14 using electrical power generated by the micro-turbine alternator system 100 of the electrical power generation system 50. The micro-turbine alternator system 100 is configured to convert fuel to electrical power to power at least the electric motors 15 of the lift rotors 14. The fuel is provided from one or more fuel storage tanks 24 operably connected to the micro-turbine alternator system 100. In some embodiments, the fuel utilized is JP-8. The micro-turbine alternator system 100 may utilize compressed air provided from a compressed air tank 26 at 4500 psig and regulated to about 750 psig. The compressed air from the compressed air tank 26 of FIG. 1 may be utilized to provide the motive pressure required to drive the liquid fuel through a turbine speed control valve (not shown) and into a combustion chamber. Alternatively, an electric driven pump may be used in place of the compressed air.

Figure 2:
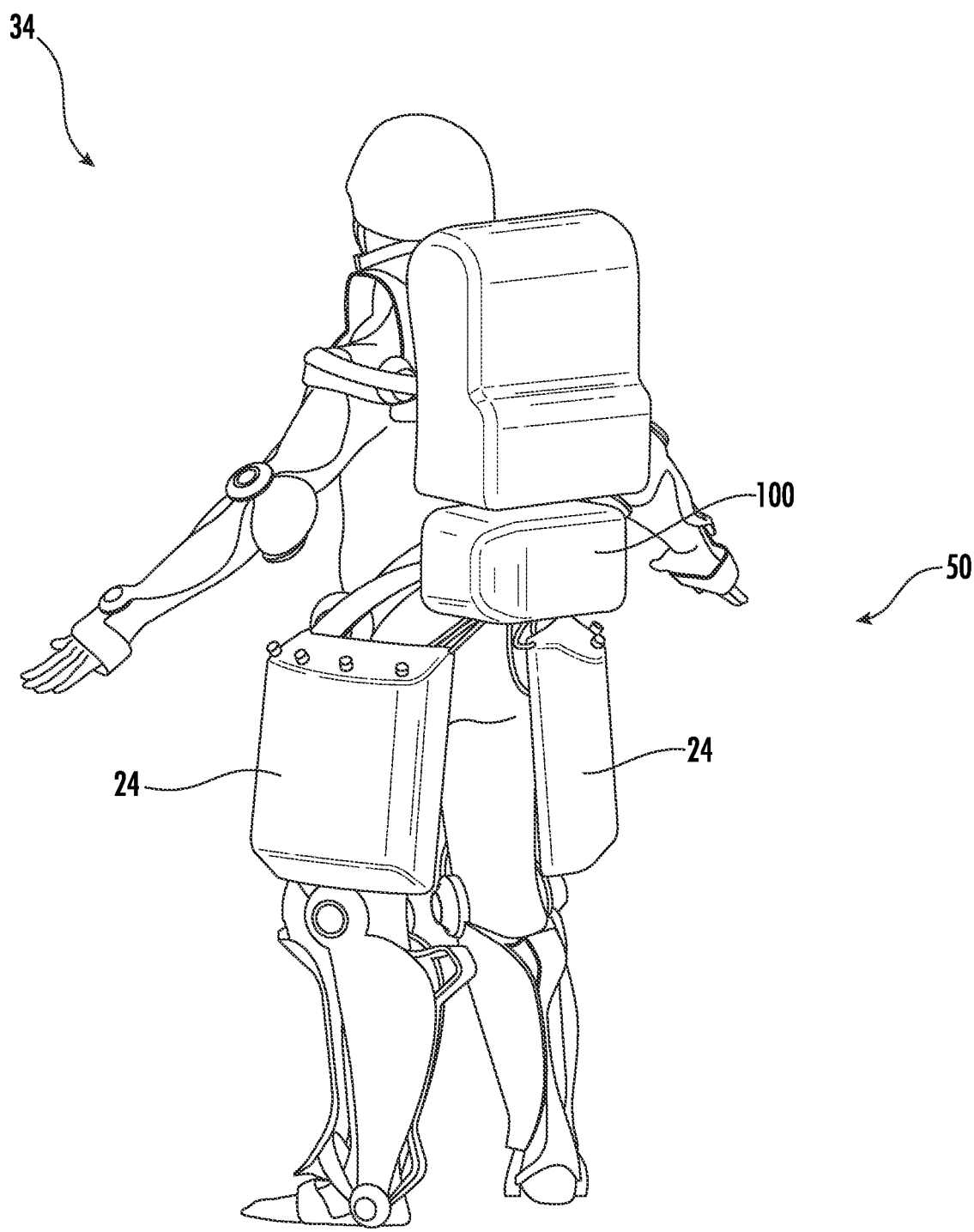
FIG. 2 is an isometric view of a powered suit including a power generation system, according to an embodiment of the present disclosure.

Referring now to FIG. 2, with continued reference to FIG. 1, an isometric view of an electrically-powered suit 34 is illustrated in accordance with an embodiment of the present disclosure. While in FIG. 1, the micro-turbine alternator system 100 is described as utilized in a UAV 10, the micro-turbine alternator system 100 disclosed herein may be readily applied to other systems, and may be utilized in, for example, an electrically-powered suit 34, as shown in FIG. 2.

The electrically-powered suit 34 is operably connected to an electrical power generation system 50, which includes a micro-turbine alternator system 100. The micro-turbine alternator system 100 is configured to convert fuel to electrical power to power the electrically-powered suit 34. The fuel is provided from one or more fuel storage tanks 24 operably connected to the micro-turbine alternator system 100. In some embodiments, the fuel utilized is JP-8. The fuel storage tanks 24 may be located on legs of the electrically-powered suit 34, as illustrated in FIG. 2.

It is understood that the micro-turbine alternator system 100 is not limited to a UAV 10 and an electrically-powered suit 34 application, and the micro-turbine alternator system 100 may be applied to other systems not disclosed herein.

Figure 3:
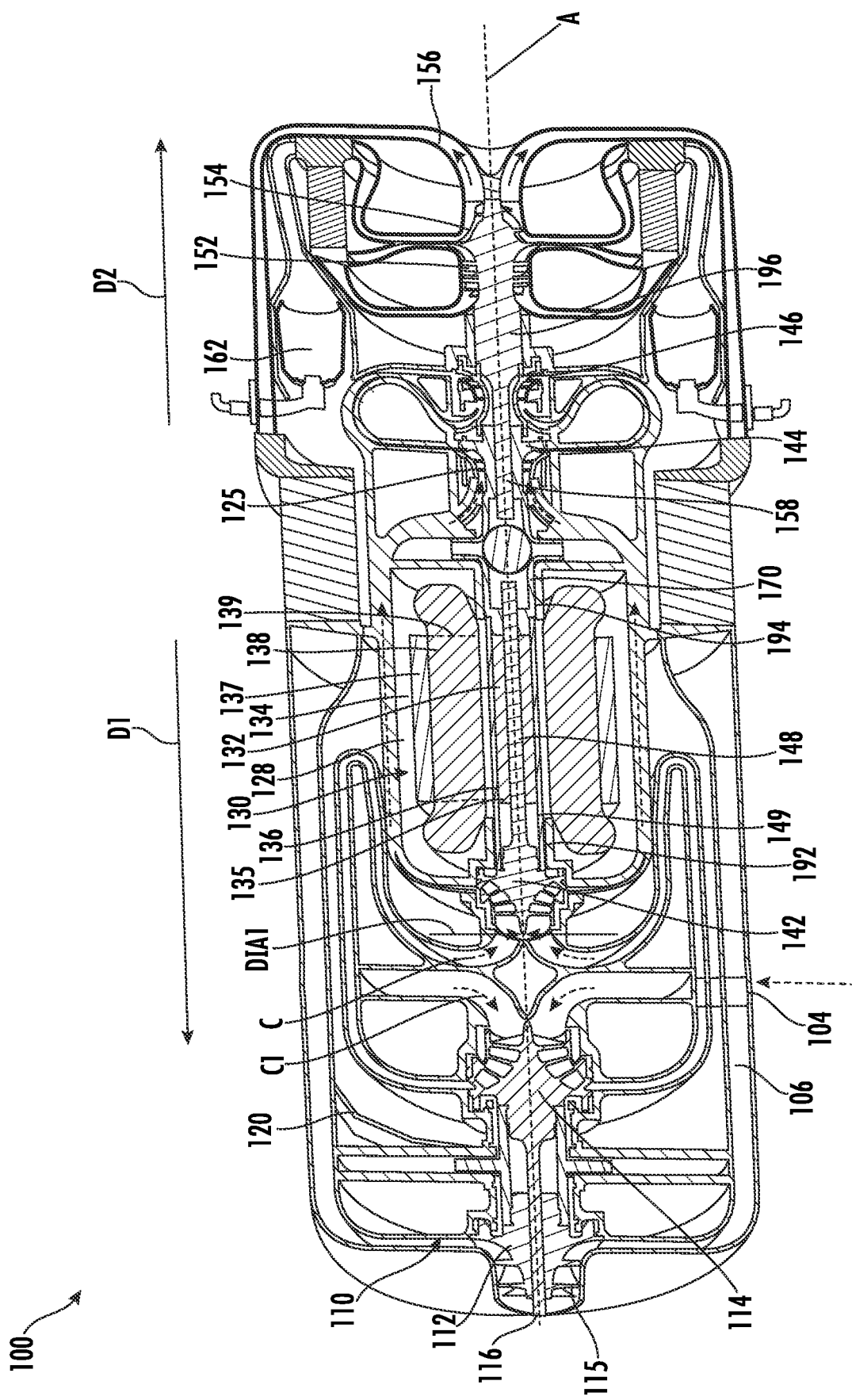
FIG. 3 is an isometric cut-away view of a micro-turbine alternator for use in the power generation system of FIGS. 1 and 2, according to an embodiment of the present disclosure.

Referring now to FIG. 3, an isometric cut-away view of the micro-turbine alternator system 100 is illustrated, in accordance with an embodiment of the present disclosure. The micro-turbine alternator system 100 includes a first stage compressor 142, a second stage compressor 144, a third stage compressor 146, a first stage turbine 152, and a second stage turbine 154. The first stage compressor 142, the second stage compressor 144, the third stage compressor 146, the first stage turbine 152, and the second stage turbine 154 are oriented along a central longitudinal axis A of the micro-turbine alternator system 100. The micro-turbine alternator system 100 also includes an electric generator 130 located between the first stage compressor 142 and the second stage compressor 144 as measured along the central longitudinal axis A.

Advantageously, by locating the electric generator 130 between the first stage compressor 142 and the second stage compressor 144, the overall physical size of the micro-turbine alternator system 100 is reduced. As a result, the micro-turbine alternator system 100 according to one or more embodiments may be used in a UAV 10, an electrically-powered suit 34, or another system that benefits from untethered, lightweight power generation.

The micro-turbine alternator system 100 also includes an alternator stator cooling heat exchanger 128 configured to utilize airflow from the first stage compressor 142 to cool the electric generator 130. The alternator stator cooling heat exchanger 128 may encircle or enclose the electric generator 130 and may be configured to pass airflow from the first stage compressor 142 through or around the electric generator 130. Advantageously, by locating the electric generator 130 between the first stage compressor 142 and the second stage compressor 144, moderately cool air in the core flow path C from the first stage compressor 142 is forced through the alternator stator cooling heat exchanger 128 and heat may be drawn out of the electric generator 130 and to the airflow within the alternator stator cooling heat exchanger 128.

The electric generator 130 may be a permanent magnet alternator, an induction generator, a switched reluctance generator, a wound field generator, a hybrid generator, or any other type of alternator known to one of skill in the art. As illustrated in FIG. 3, the electric generator 130 may be a permanent magnet alternator that includes a rotor element 132 and a stator element 134 radially outward from the rotor element. In other words, the rotor element 132 is located radially inward from the stator element 134 as measured relative to the central longitudinal axis A. It is understood that the embodiments disclosed herein may be applicable to a rotor element 132 that is located radially outward from the stator element 134. The rotor element 132 may be rotated around the central longitudinal axis A to generate electricity.

The rotor element 132 includes an annular base member 135, an annular array of permanent magnets 136 that are respectively coupled to an outer diameter of the annular base member 135. The rotor element 132 may include a magnet retention band that fits over an outer diameter of the permanent magnet 136, and keeps the permanent magnet 136 on the rotating annular base member 135. In accordance with further embodiments, the stator element 134 includes a hub 137, a plurality of spokes 139 extending radially inward from the hub 137 and conductive elements 138 that are wound around the spokes 139 to form windings. When the rotor element 132 is rotated around the central longitudinal axis A a rotating flux field is generated by the permanent magnets 136 and this rotating flux field generates an alternating current in the conductive elements 138 to generate electricity for use by the UAV 10 of FIG. 1 or the electrically-powered suit 34 of FIG. 2.

The micro-turbine alternator system 100 includes a combustion chamber 162, in which a fuel-air mixture is combusted, with the combustion products utilized to drive an electric generator 130. In some embodiments, the fuel utilized in the combustion chamber 162 is JP-8. The micro-turbine alternator system 100 converts the energy of the combustion products into electrical power by urging the combustion products through the first stage turbine 152 and the second stage turbine 154, which are operably connected to and configured to rotate the rotor element 132 of the electric generator 130. The electrical energy generated by the electric generator 130 may then be rectified via a generator rectifier (not shown) and utilized by the propulsion/lift system 12 of FIG. 1 or the electrically-powered suit 34 of FIG. 2. The compressed air from the compressed air tank 26 of FIG. 1 may be utilized to provide the motive pressure required to drive the liquid fuel through a turbine speed control valve (not shown) and into the combustion chamber 162.

The first stage compressor 142 is located forward of the second stage compressor 144 and the third stage compressor 146 as measured along the central longitudinal axis A, and the second stage compressor 144 is located forward of the third stage compressor 146 as measured along the central longitudinal axis A. In other words, the second stage compressor 144 is located aft of the first stage compressor 142 and the third stage compressor 146 is located aft of the second stage compressor 144 as measured along the central longitudinal axis A. The forward direction D1 and the aft direction D2 are illustrated in FIG. 3. The first stage turbine 152 is located forward of the second stage turbine 154 as measured along the central longitudinal axis A. In other words, the second stage turbine 154 is located aft of the first stage turbine 152 as measured along the central longitudinal axis A. The first stage compressor 142, the second stage compressor 144, and the third stage compressor 146 are located forward of first stage turbine 152 and the second stage turbine 154 as measured along the central longitudinal axis A.

The micro-turbine alternator system 100 includes a compressor shaft 148 oriented along and co-axial to the central longitudinal axis A. In an embodiment, the compressor shaft 148 is a tie bolt and is used to compress a rotating group of components including the first stage compressor 142, compressor transfer tube 149, the compressor shaft 148, and a second journal bearing 194 in the axial direction, causing the multi-segment shaft to act as a single stiff shaft. The compressor shaft 148 may be attached or operably connected to the first stage compressor 142. The micro-turbine alternator system 100 includes a turbine shaft 158 oriented along and co-axial to the central longitudinal axis A. The turbine shaft 158 may be attached or operably connected to the first stage turbine 152 and the second stage turbine 154.

The micro-turbine alternator system 100 includes a coupling assembly 170 configured to operably connect the turbine shaft 158 to the compressor shaft 148. The coupling assembly 170 may be attached or operably connected to the second stage compressor 144. The compressor shaft 148 extends in the aft direction D2 away from the first stage compressor 142 and through the electric generator 130 to operably connect to the coupling assembly 170. In an embodiment, the compressor shaft 148 is located radially inward of the rotor element 132.

Advantageously, locating the electric generator 130 between the first stage compressor 142 and the second stage compressor 144 allows the first stage compressor 142 to have a reduced inlet hub diameter that is smaller than a diameter of the rotor element 132. Having a reduced inlet hub diameter DIA1 reduces the inlet flow relative velocity, increasing the aerodynamic performance of the first stage compressor 142 and increasing the swallowing capacity of the first stage compressor 142. If the electric generator 130 was located forward of the first stage compressor 142, then the compressor shaft 148 would have to extend forward of the first stage compressor 142 and thus the inlet hub diameter DIA1 would have to be increased to a diameter of the compressor shaft 148, thus decreasing the aerodynamic performance of the first stage compressor 142 and decreasing the swallowing capacity of the first stage compressor 142.

The turbine shaft 158 extends in the forward direction D1 away from the first stage turbine 152 to operably connect to the coupling assembly 170. The turbine shaft 158, the coupling assembly 170, and the compressor shaft 148 are configured to rotate in unison. Thus, when exhaust 102 from the combustion chamber 162 drives rotation of the first stage turbine 152 and the second stage turbine 154, the rotation of the first stage turbine 152 and the second stage turbine 154 drives rotation of the turbine shaft 158, which drives rotation of the coupling assembly 170 and the compressor shaft 148. The rotation of the compressor shaft 148 drives rotation of the first stage compressor 142. The rotation of the coupling assembly 170 drives rotation of the second stage compressor 144. The third stage compressor 146 is operably connected to the second stage compressor 144 and the turbine shaft 158, and thus rotation of the second stage compressor 144 and the turbine shaft 158 drives rotation of the third stage compressor 146.

It is understood that while the compressor shaft 148, the turbine shaft 158, and the coupling assembly 170 are described as three different shafts, the embodiments disclosed herein may be applicable to micro-turbine alternator system 100 having one or more shafts. In an embodiment, the electric generator 130 is disposed along the one or more shafts between the first stage compressor 142 and the second stage compressor 144. In another embodiment, the electric generator 130 is disposed along the compressor shaft 148 between the first stage compressor 142 and the second stage compressor 144. The electric generator 130 is located aft of the first stage compressor 142 and forward of the second stage compressor 144. In another embodiment, at least one of the one or more drive shafts passes through the electric generator 130. In another embodiment, the compressor shaft 148 passes through the electric generator 130.

The compressor shaft 148, the turbine shaft 158, and the coupling assembly 170 are coaxial and rotate via the bearing systems about the central longitudinal axis A, which is colinear with their longitudinal axes. The bearing system includes a first journal bearing 192 located between the compressor transfer tube 149 and the frame 106 of the micro-turbine alternator system 100. The bearing system includes a second journal bearing 194 located between the coupling assembly 170 and the frame 106 of the micro-turbine alternator system 100. The bearing system includes a third journal bearing 196 located between the turbine shaft 158 and the frame 106 of the micro-turbine alternator system 100.

Advantageously, locating the electric generator 130 between the first stage compressor 142 and the second stage compressor 144 provides for very effective bearing placement around the compressor shaft 148, which increases the stiffness of the compressor shaft 148. The increased stiffness of the compressor shaft 148 allows for an increase in the critical speed of the compressor shaft 148.

Also, advantageously, by locating the electric generator 130 between the first stage compressor 142 and the second stage compressor 144, the alternator stator cooling heat exchanger 128 helps reduce the operating temperature of the electric generator 130, while the airflow through the alternator stator cooling heat exchanger 128 also experiences a pressure drop. This pressure drop through the alternator stator cooling heat exchanger 128 forces some of the airflow from the first stage compressor 142 through the rotor element 132 and to a stator gap between the rotor element 132 and the stator element 134, which provides cooling air to the rotor element 132, the first journal bearing 192, and the second journal bearing 194.

The compressor transfer tube 149 extends from the first stage compressor 142 to the second stage compressor 144 through the electric generator 130. The compressor transfer tube 149 is co-axial with the electric generator 130. The rotor element 132 with the annular base member 135 and the annular array of permanent magnets 136 are located radially inward of the compressor transfer tube 149 measured relative to the central longitudinal axis A. The stator element 134 with the hub 137, the conductive elements 138, and the spokes 139 are located radially outward of the compressor transfer tube 149 measured relative to the central longitudinal axis A.

The first stage compressor 142, the second stage compressor 144, and the third stage compressor 146 drive air along a core flow path C for compression and communication in the combustion chamber 162. The airflow in the core flow path C is compressed by the first stage compressor 142, the second stage compressor 144, and the third stage compressor 146, is mixed with fuel and burned in the combustion chamber 162, and is then expanded over the first stage turbine 152 and the second stage turbine 154. The first stage turbine 152 and the second stage turbine 154 rotationally drive the turbine shaft 158 in response to the expansion. The combustion products are exhausted from the second stage turbine 154 through a turbine exit 156.

Each of the first stage compressor 142, the second stage compressor 144, the third stage compressor 146, the first stage turbine 152, and the second stage turbine 154 may include rows of rotor assemblies (shown schematically) that carry airfoils that extend into the core flow path C. For example, the rotor assemblies can carry a plurality of rotating blades 125. The blades 125 of the rotor assemblies create or extract energy (in the form of pressure) from the core airflow that is communicated through the micro-turbine alternator system 100 along the core flow path C.

The micro-turbine alternator system 100 may include an auxiliary turbo charger 110 to pre-compress the airflow 108 prior to entering the core flow path C. The auxiliary turbo charger 110 includes a turbo compressor 114 and a turbine 112 operably connected to the turbo compressor 114 through a turbo compressor drive shaft 116. The turbo compressor 114 is configured to rotate when the turbine 112 rotates.

The turbo compressor 114 is configured to pull external airflow 108 through one or more air inlets 104 in the frame 106 into a compressor flow path C1. The turbo compressor 114 is configured to compress the external airflow 108 in the compressor flow path C1 and deliver the airflow 108 to the first stage compressor 142 in the core airflow path C.

Each of the turbine 112 and the turbo compressor 114 may include rows of rotor assemblies (shown schematically) that carry airfoils that extend into the compressor flow path C1. For example, the rotor assemblies can carry a plurality of rotating blades 115. The blades 115 of the rotor assemblies for the turbine 112 extract energy (in the form of pressure and temperature) from the exhaust 102 that is communicated through the micro-turbine alternator system 100 along the core flow path C. The blades 115 of the rotor assemblies for the turbo compressor 114 create energy (in the form of pressure and temperature) from the airflow 108 that is communicated through the micro-turbine alternator system 100 along the compressor flow path C1.

Combustor exhaust 102 exiting the turbine exit 156 is directed to the turbine 112 of the auxiliary turbo charger 110. The exhaust 102 is then expanded over the turbine 112 of the auxiliary turbo charger 110. The turbine 112 rotationally drives the turbo compressor drive shaft 116 in response to the expansion. Rotation of the turbo compressor drive shaft 116 causes the turbo compressor 114 to rotate and compress the airflow 108 within the compressor flow path C1.

Some embodiments further include a thermal electric energy recovery system 120, configured to recover additional energy from exhaust 102 of the micro-turbine alternator system 100 before the exhaust 102 has flowed through the turbine 112 of the auxiliary turbo charger 110.

Figure 5:
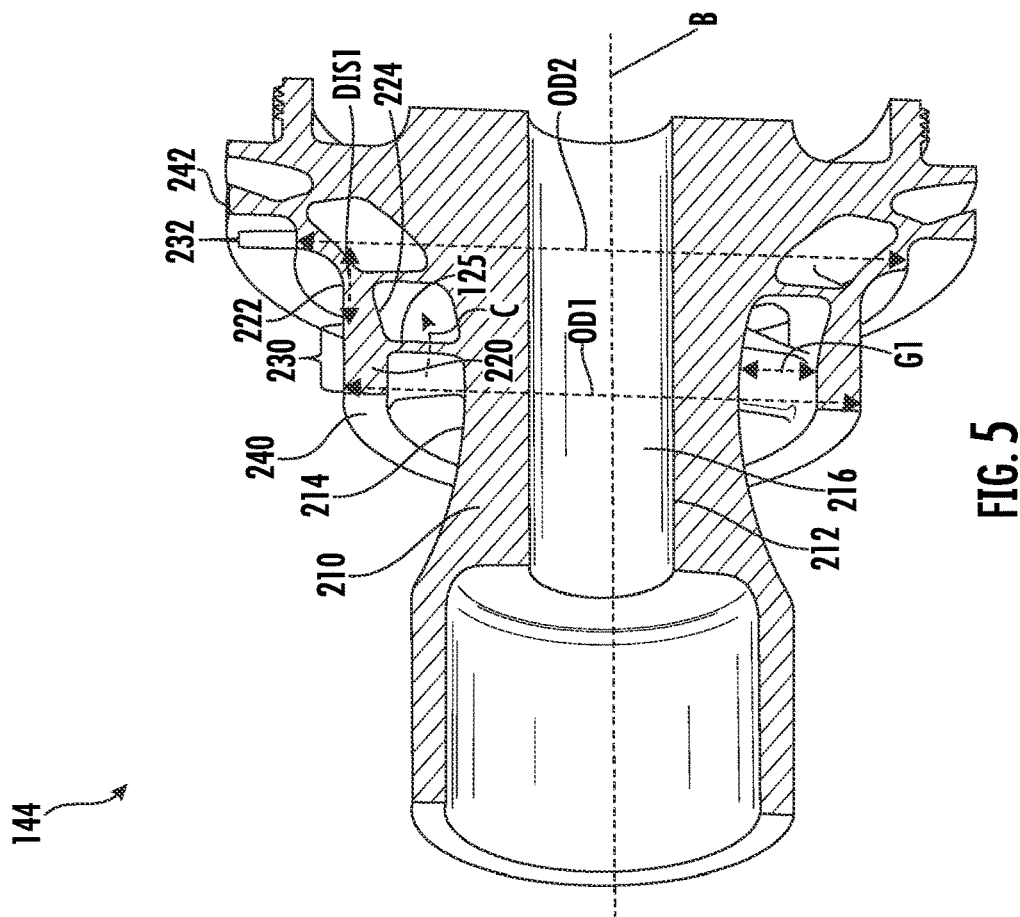
FIG. 5 is an isometric cutaway view of the second stage compressor of the micro-turbine alternator, according to an embodiment of the present disclosure.
Figure 4:
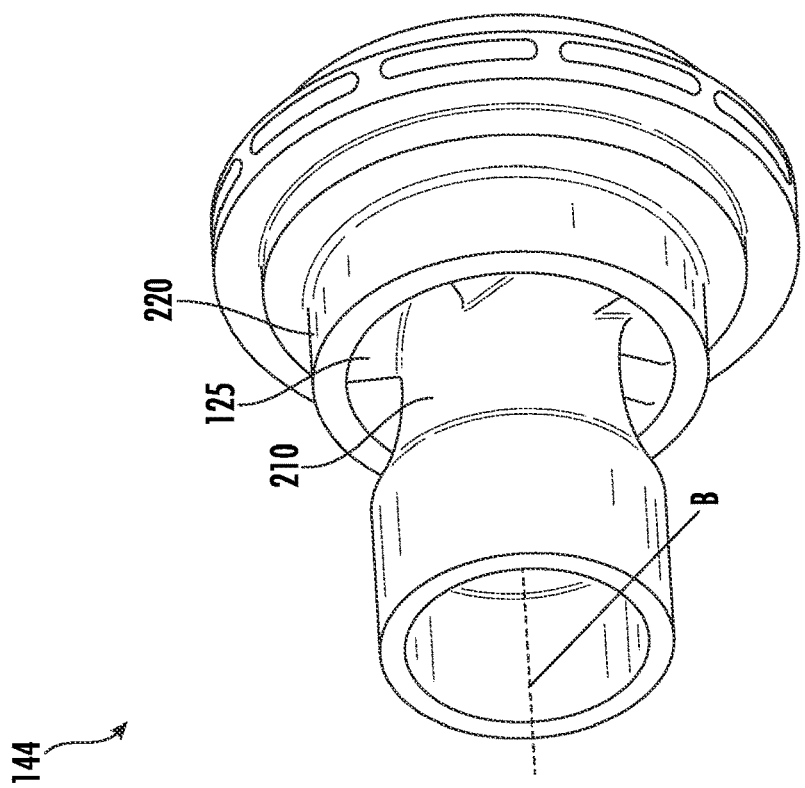
FIG. 4 is an isometric view of a second stage compressor of the micro-turbine alternator, according to an embodiment of the present disclosure.

Referring now to FIGS. 4 and 5, with continued reference to FIGS. 1-3, an isometric view of the second stage compressor 144 is illustrated in FIG. 4 and an isometric cutaway view of the second stage compressor 144 is illustrated in FIG. 5, in accordance with an embodiment of the present disclosure. It is understood that while FIGS. 4 and 5 and the associated description discuss the embodiments disclosed in relation with the second stage compressor 144, the embodiments disclosed herein are not limited to the second stage compressor 144 and may be applicable to other compressors within the micro-turbine alternator system 100 or any other system where compressors or pumps are required.

The second stage compressor 144 includes central shaft 210. The central shaft 210 is coaxial to a compressor longitudinal axis B. The central shaft 210 rotates about the compressor longitudinal axis B. When the second stage compressor 144 is installed within the micro-turbine alternator system 100 of FIG. 3, the compressor longitudinal axis B is colinear with the central longitudinal axis A. In other words, the compressor longitudinal axis B and the central longitudinal axis A are the same axis when the second stage compressor 144 is installed within the micro-turbine alternator system 100 of FIG. 3.

The central shaft 210 includes an external surface 214 and an internal surface 216. The central shaft 210 includes a passageway 212 formed therein. The internal surface 216 defines the passageway 212. The passageway 212 is coaxial with the compressor longitudinal axis B. The passageway 212 may be tubular in shape and configured to fit the turbine shaft 158 (See FIG. 3). In other words, the turbine shaft 158 is configured to fit within the passageway 212.

The second stage compressor 144 includes a shroud 220 extending circumferentially around the central shaft 210. The shroud 220 is separated from the central shaft 210 by a gap G1. The gap G1 extends circumferentially around the compressor longitudinal axis B and may vary in size moving from a forward end 240 of the shroud 220 to an aft end 242 of the shroud 220. The shroud 220 encircles the central shaft 210. The shroud 220 includes a radially outward surface 222 and a radially inward surface 224 located opposite the radially outward surface 222. The core flow path C is defined between the external surface 214 of the central shaft 210 and the radially inward surface 224 of the shroud 220. In other words, the external surface 214 of the central shaft 210 and the radially inward surface 224 of the shroud 220 are in a facing spaced relationship forming the core flow path C therebetween.

The radially outward surface 222 of the shroud 220 may have a first outer diameter OD1 along a first portion 230 of the shroud 220. Alternatively, the first outer diameter OD1 may be slightly raised in the first portion 230 with an undercut aft of the first portion 230 in the radially outward surface 22. The undercut may facilitate grinding operations. The first portion 230 may be located at the forward end 240 of the shroud 220. The radially outward surface 222 of the shroud 220 may have a second outer diameter OD2 along a second portion 232 of the shroud 220. The second outer diameter OD2 is greater than the first outer diameter OD1. The second portion 232 of the shroud 220 is located at a first distance DIS1 away from the first portion 230 as measured along the compressor longitudinal axis B. The second portion 232 may be closer to the aft end 242 of the shroud 220 than to the forward end 240.

The second stage compressor 144 includes a plurality of blades 125 circumferentially encircling the central shaft 210. Each of the plurality of blades 125 extend from the external surface 214 of the central shaft 210 to the radially inward surface 224 of the shroud 220. The blades 125 of the second stage compressor 144 transfer the mechanical energy of the rotating shaft into pneumatic energy in the fluid stream (in the form of dynamic pressure) by compressing and accelerating the airflow in the core airflow path C. The blades 125 may be contoured between the external surface 214 of the central shaft 210 and the radially inward surface 224 of the shroud 220 to appropriately compress and accelerate the airflow in the core airflow path C as required.

The second stage compressor 144 is a monolithic structure rather than being assembled from separate individually formed components that are then assembled. The term monolithic may be defined as an object that is cast or formed as single piece without joints or seams. In other words, the second stage compressor 144 is formed as a single piece comprising a unitary structure. In an embodiment, the second stage compressor 144 has no joints or seams. The second stage compressor 144 may be manufactured or formed via additive manufacturing. Additive manufacturing may include, but is not limited to 3D printing, laser powder bed fusion (L-PBF) additive manufacturing, investment casting (using the rapid prototype method) or any other additive manufacturing technique known to one of skill in the art.

Figure 7:
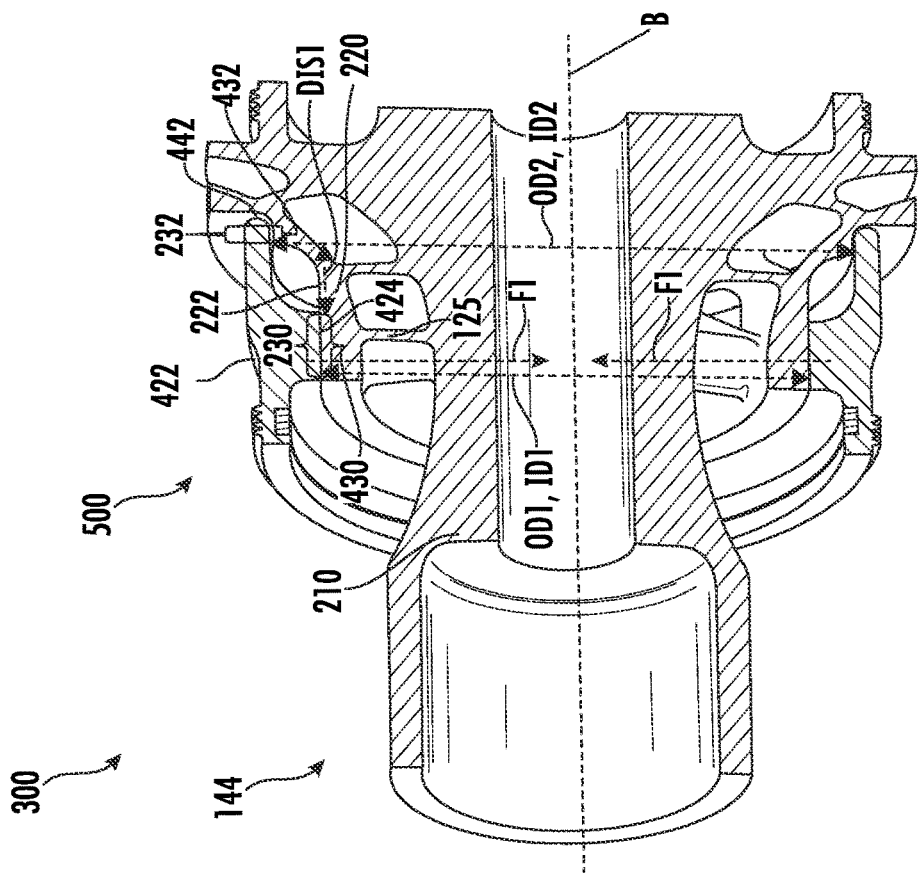
FIG. 7 is an isometric cutaway view of the compressor assembly of the micro-turbine alternator, according to an embodiment of the present disclosure.
Figure 6:
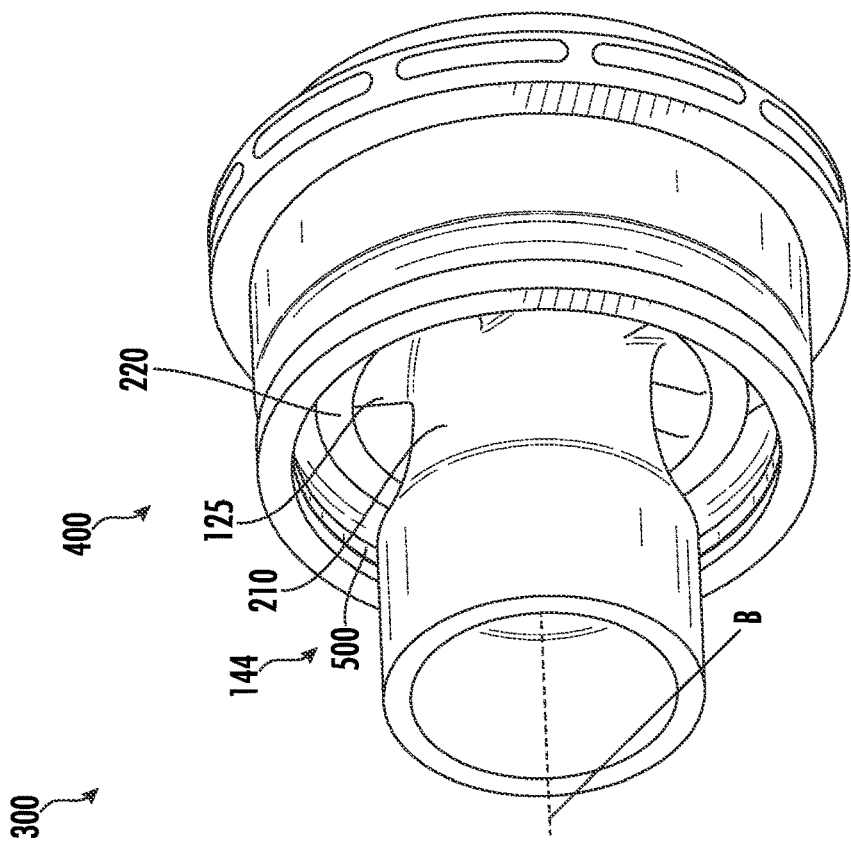
FIG. 6 is an isometric view of a compressor assembly of the micro-turbine alternator, according to an embodiment of the present disclosure.

Referring now to FIGS. 6 and 7, with continued reference to FIGS. 1-5, an isometric view of a compressor assembly 300 is illustrated in FIG. 6 and an isometric cutaway view of the compressor assembly 300 is illustrated in FIG. 7, in accordance with an embodiment of the present disclosure.

The compressor assembly 300 includes the second stage compressor 144 and the compression ring 400 extending circumferentially around the shroud 220 of the second stage compressor 144. It is understood that while FIGS. 6 and 7 and the associated description discuss the embodiments disclosed in relation with the second stage compressor 144, the embodiments disclosed herein are not limited to the second stage compressor 144 and may be applicable to other compressors within the micro-turbine alternator system 100 or any other system where compressors are required.

The compression ring 400 is a stress relieving compressor shroud compression ring and is configured to relieve stress on the second stage compressor 144 during operation by compressing the second stage compressor 144. The compression ring 400 is configured to relieve stress on the second stage compressor 144 by compressing the shroud 220. The compression ring 400 is configured to apply an approximately equal pressure circumferentially around the radially outward surface 222 of the shroud 220 towards central shaft 210 and the compressor longitudinal axis B.

As previously noted, since the second stage compressor 144 is manufactured utilizing additive manufacturing techniques it may have a reduces tensile strength in comparison to a subtractive manufactured impeller. In an embodiment, the second stage compressor 144 may be composed of titanium. The material strength capability or tensile strength for additive manufactured titanium may be about 120 ksi. However, due to the high rotational operating speed of the second stage compressor 144, the second stage compressor 144 may experience a tensile stress of about 150 ksi. Embodiments disclosed herein seek to utilize a compression ring 400 that is installed via an interference fit around the shroud 220 of the second stage compressor 144. The compression ring 400 bridges the gap between the material strength capability of the additively manufactured second stage compressor 144 and the operational tensile stress experienced during operation by compressing the shroud 220 and the blades 125 into the central shaft 210.

The compression ring 400 includes a radially inner surface 424 and a radially outer surface 422 opposite the radially inner surface 424. The radially inner surface 424 of the compression ring 400 is configured to mate flush with one or more portions 230, 232 of the radially outward surface 222 of the shroud 220. The radially inner surface 424 of the compression ring 400 is configured to apply a radially inward compressive force F1 along the one or more portions 230, 232 of the radially outward surface 222 of the shroud 220. The radially inward compressive force F1 is configured to compress the shroud 220 and the blades 125 into the central shaft 210, which helps relieve operational tensile stress on the shroud 220 and the blades 125 when rotating at operational speeds. As shown in FIG. 7, the radially inward compressive force F1 is directed towards the compressor longitudinal axis B.

The compression ring 400 utilizes an interference fit with the shroud 220 to place the shroud 220 in compression when the second stage compressor 144 is at rest. More specifically, the radially inner surface 424 of the compression ring 400 utilizes an interference fit with the radially outward surface 222 of the shroud 220 to place the shroud 220 in compression when the second stage compressor 144 is at rest. The radially inner surface 424 of the compression ring 400 utilizes an interference fit with one or more portions 230, 232 of the radially outward surface 222 of the shroud 220 to place the shroud 220 in compression when the second stage compressor 144 is at rest.

As the rotational speed of the compressor assembly 300 increases, the compression stress from the compression ring 400 decreases, until the micro-turbine alternator system 100 reaches about 50% speed. At this speed, the blades 125 of the second stage compressor 144 may not be subject to any stress. As the speed continues to increase, the blade 125 stress starts to increase in the tensile direction. By full speed, the tensile stress in the blades 125 may be about 50% of the tensile stress that would be present without the compression ring 400 helping to support the mass of the shroud 220.

An inner diameter ID1, ID2 of the radially inner surface 424 of the compression ring 400 may vary in size to mate properly with the first portion 230 and the second portion 232 of the radially outward surface 222 of the shroud 220. The radially inner surface 424 of the compression ring 400 includes a first area 430 and a second area 432.

The second area 432 is located at a first distance DIS1 away from the first area 430 as measured along the compressor longitudinal axis B. The second area 432 may be closer to an aft end 442 of the compression ring 400 than to a forward end 440.

The first area 430 of the radially inner surface 424 of the compression ring 400 is configured to mate flush with the first portion 230 of the radially outward surface 222 of the shroud 220. The second area 432 of the radially inner surface 424 of the compression ring 400 is configured to mate flush with the second portion 232 of the radially outward surface 222 of the shroud 220.

The radially inner surface 424 of the compression ring 400 has a first inner diameter ID1 along the first area 430 of the radially inner surface 424 of the compression ring 400. The radially inner surface 424 of the compression ring 400 has a second inner diameter ID2 along the second area 432 of the radially inner surface 424 of the compression ring 400. The second inner diameter ID2 is greater than the first inner diameter ID2.

In order to accomplish the interference fit, when disassembled, the first inner diameter ID1 of the radially inner surface 424 of the compression ring 400 is less than the first outer diameter OD1 of the radially outward surface 222 of the shroud 220 and the second inner diameter ID2 of the radially inner surface 424 of the compression ring 400 is less than the second outer diameter OD2 of the radially outward surface 222 of the shroud 220. To assemble, the compression ring 400 is expanded by a heat source, the second stage compressor 144 is shrunk by a cold source, and then the compression ring 400 is slid onto the shroud 220. Once assembled and the temperature of compression ring 400 and the second stage compressor 144 reach equilibrium, the first inner diameter ID1 of the radially inner surface 424 of the compression ring 400 is about equal to the first outer diameter OD1 of the radially outward surface 222 of the shroud 220 and the second inner diameter ID2 of the radially inner surface 424 of the compression ring 400 is about equal to the second outer diameter OD2 of the radially outward surface 222 of the shroud 220.

Once the second stage compressor 144 starts to spin, the pre-loaded blades 125 (in compression while at rest) relax as centrifugal force causes the shroud 220 and the compression ring 400 to expand. Advantageously, the compression ring 400 is configured to allow the transfer of the centrifugal load from the shroud 220 to the compression ring 400.

In an embodiment, the compression ring 400 is formed via subtractive machining and thus has an increased tensile strength in comparison to the second stage compressor 144 that was additively manufactured. In an embodiment, the compression ring 400 may be machined from a titanium allow billet with a tensile strength of about 170 ksi. In another embodiment, the second stage compressor 144 has a first tensile strength and the compression ring 400 has a second tensile strength that is greater than the first tensile strength.

In an embodiment, the second stage compressor 144 may be composed of additive manufactured titanium with a tensile strength of about 120 ksi and the compression ring 400 may be machined from a titanium alloy billet with a tensile strength of about 170 ksi, which would advantageously reduce the maximum tensile stresses experienced in the additively manufactured second stage compressor 144 and shroud 220 to less than 115 ksi during rotational operation.

Figure 8:
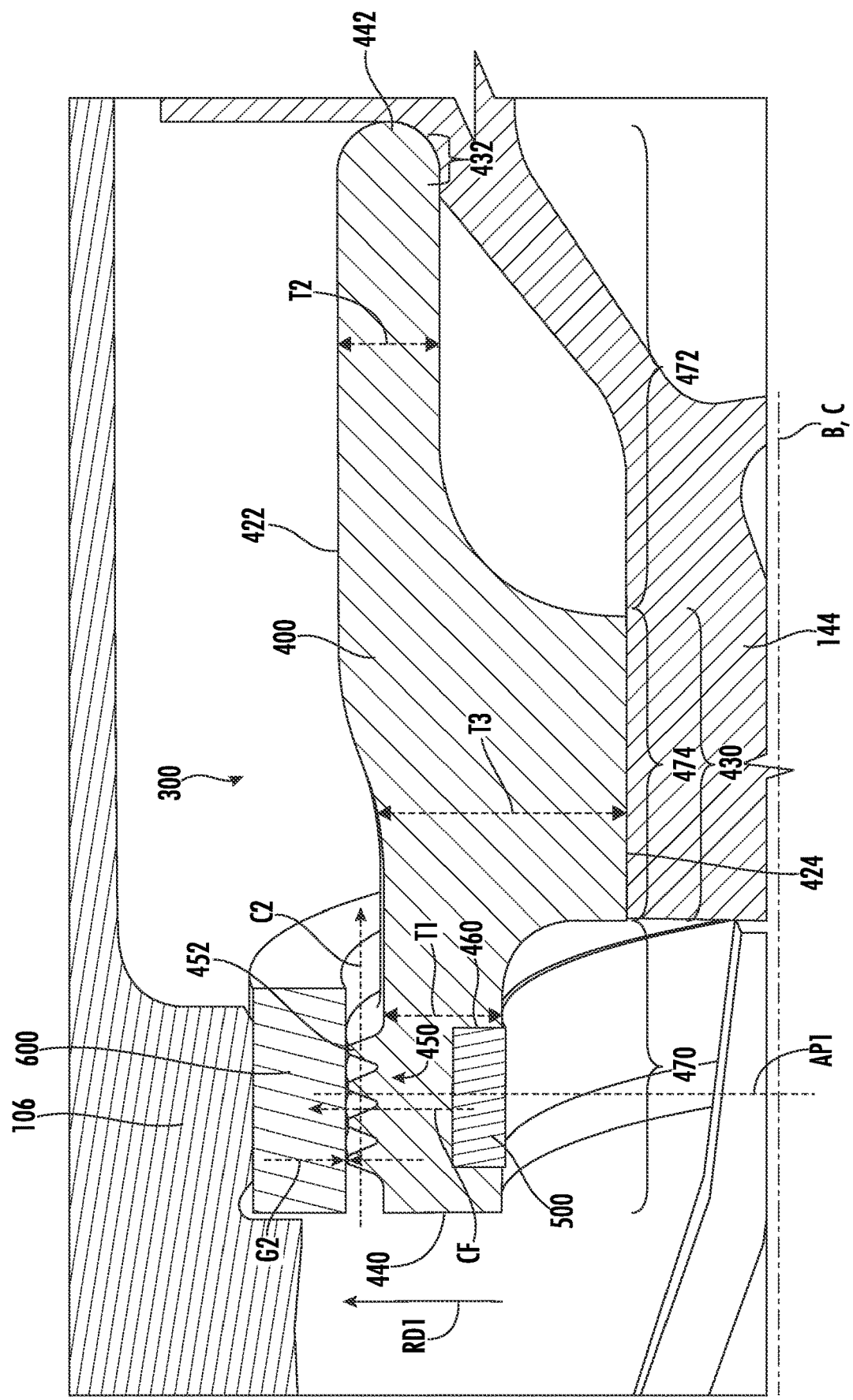
FIG. 8 is an enlarged isometric cutaway view of the compressor assembly of the micro-turbine alternator, according to an embodiment of the present disclosure.

Referring now to FIG. 8, with continued reference to FIGS. 1-7, an enlarged isometric cutaway view of the compressor assembly 300 is illustrated, in accordance with an embodiment of the present disclosure. The compression ring 400 includes a labyrinth seal 450 located on the radially outer surface 422 of the compression ring 400. The labyrinth seal 450 is configured to seal between the frame 106 and the compressor assembly 300, thus preventing air leakage around the compressor assembly 300 through sealing path C2. As illustrated in FIG. 8, there may be a labyrinth seal mating ring 600 operably attached to the frame 106. The labyrinth seal 450 is located radially inward from the labyrinth seal mating ring 600. The labyrinth seal mating ring 600 encircles the labyrinth seal 450 and is configured to remain stationary while the labyrinth seal 450 rotates with the compressor assembly 300. The labyrinth seal mating ring 600 is coaxial to the central longitudinal axis A (See FIG. 3).

When the compressor assembly 300 is at rest or not rotating there may be a radial gap G2 between the labyrinth seal 450 and the labyrinth seal mating ring 600. In conventional labyrinth seals, the radial gap may be fixed. With a fixed radial gap, the leakage rate is proportional to the impeller pressure rise, leading to more leakage at higher operating speeds. Embodiments disclosed herein, seek to provide a labyrinth seal 450 that incorporates an ability to change or adjust the radial gap G2 as a function of the rotational speed of the compressor assembly 300.

The compression ring 400 includes a groove 460 located within the radially inner surface 424 of the compression ring 400. The groove 460 extends circumferentially around the radially inner surface 424, the central longitudinal axis A, and the compressor longitudinal axis B. The compressor assembly 300 includes a load ring 500 located within the groove 460 in the radially inner surface 424 of the compression ring 400.

The groove 460 and the load ring 500 are located opposite the labyrinth seal 450. In other words, the groove 460 and the load ring 500 are located radially inward of the labyrinth seal 450 as measured relative to the central longitudinal axis A and the compressor longitudinal axis B. The groove 460, the labyrinth seal 450, and the load ring 500 are located at about the same axial position AP1 as measured linearly along the central longitudinal axis A and the compressor longitudinal axis B. In an embodiment, the groove 460, the labyrinth seal 450, and the load ring 500 may located proximate the forward end 440 of the compression ring 400. In an alternate embodiment, the load ring 500 and the groove 460 may be located on the forward end 440.

To insert the load ring 500 into the groove 460, the load ring 500 may be shrunk by cooling it and the compression ring 400 may be expanded by heating it until the load ring 500 could be inserted into the groove 460. Once the assembly came to a common temperature or reached equilibrium then the load ring 500 would be trapped or secured in the groove 460.

The labyrinth seal 450 is in a facing spaced relationship with the labyrinth seal mating ring 600 defining a radial gap G2 therebetween. The labyrinth seal 450 may include one or more teeth 452. In an embodiment, the labyrinth seal 450 includes four teeth 452. The labyrinth seal 450 is configured to change or adjust the radial gap G2 as a function of the rotational speed of the compressor assembly 300 using the load ring 500. The radial gap G2 is measured from the teeth 452 to the labyrinth seal mating ring 600. The labyrinth seal 450 is configured to reduce the radial gap G2, using a centrifugal force CF generated by the load ring 500 as a rotational speed of the compressor assembly 300 increases. As a rotational speed of the compressor assembly 300 increases the radial gap G2 may go to zero and even a negative value that is less than zero as the teeth 452 dig into the labyrinth seal mating ring 600.

In an embodiment, the load ring 500 may be composed of a dense material having a density greater than a density of the compression ring 400. In an embodiment, the compression ring 400 has a first density and the load ring 500 has a second density that is greater than the first density. For example, if the compression ring were titanium with a density of 4.46 g/cm3 (0.161 lb/in$^3$) then the load ring 500 may be steel with a density of 7.81 g/cm3 (0.282 lb/in$^3$).

As the rotational speed of the compressor assembly 300 increases, the centrifugal force CF acting on the load ring 500 increases, causing the labyrinth seal 450 to deflect radially outward in the radial outward direction RD1, which causes the labyrinth radial gap G2 to be reduced and/or completely closed. The load ring 500 may be constructed from a dense material that will cause the labyrinth seal 450 to move far enough in the radial outward direction RD1 to cause the labyrinth radial gap G2 to completely close when the compressor assembly 300 is spinning at its maximum rotational speed, which would advantageously eliminate any leakage around the compressor assembly 300 through the sealing path C2. Eliminating this leakage through the sealing path C2 will allow the compressor assembly 300 to increase in efficiency compared to a conventional labyrinth seal with radial gap that remains unchanged during operation.

Further, the compression ring 400 may be broken up into three sections 470, 472, 474 to describe the features associated with the compression ring 400. In other words, the compression ring 400 is composed of three sections 470, 472, 474. The three sections 470, 472, 474 includes a first section 470 located at the forward end 440 of the compression ring 400, a second section 472 located at the aft end 442 of the compression ring 400, and a third section 474 located between the first section 470 and the second section 472. The groove 460, the labyrinth seal 450, and the load ring 500 are located in the first section 470 of the compression ring 400. The first area 430 of the radially inner surface 424 of the compression ring 400 is located in the third section 474 of the compression ring 400. The second area 432 of the radially inner surface 424 of the compression ring 400 is located in the second section 472 of the compression ring 400.

In an embodiment, the second stage compressor 144 is a shrouded compressor. In an embodiment, the first section 470 is not in contact with the second stage compressor 144. In an embodiment, the third section 474 is in contact with the second stage compressor 144. In an embodiment, the second section 472 is in contact with the second stage compressor 144. The first section 470 in cantilevered away from the third section 474, as illustrated in FIG. 8

The first section 470 has a first average thickness T1, the second section 472 has a second average thickness T2, and the third section 474 has a third average thickness T3. In another embodiment, the first average thickness T1 is less than the third average thickness T3. In another embodiment, the first average thickness T1 and the second average thickness T2 are less than the third average thickness T3.

Technical effects and benefits of the features described herein include utilizing a centrifugal force generated by a load ring to reduce a radial gap between a labyrinth seal of a shrouded compressor assembly and associated stationary non-rotating frame component.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A compression ring for a shrouded compressor, the compression ring comprising:
    a radially inner surface having one or more areas configured to mate flush with one or more portions of a radially outward surface of a shroud of the shrouded compressor;
    a radially outer surface located opposite the radially inner surface;
    a labyrinth seal located on the radially outer surface;
    a groove located within the radially inner surface; and
    a load ring located within the groove.

2. The compression ring of claim 1, wherein the compression ring has a first density and the load ring has a second density that is greater than the first density.

3. The compression ring of claim 1, wherein the groove and the load ring are located radially inward of the labyrinth seal.

4. The compression ring of claim 1, wherein the compression ring is composed of three sections including a first section, a second section, and a third section located between the first section and the second section, wherein the labyrinth seal, the groove, and the load ring are located within the first section.

5. The compression ring of claim 4, wherein the first section has a first average thickness and the third section has a third average thickness, and wherein the first average thickness is less than the third average thickness.

6. A compressor assembly, comprising:
    a compressor, comprising:
        a central shaft comprising an external surface;
        a shroud extending circumferentially around the central shaft, the shroud comprising a radially inward surface and a radially outward surface located opposite the radially inward surface, wherein the external surface of the central shaft and the radially inward surface of the shroud are in a facing spaced relationship forming a core flow path therebetween; and
        a plurality of blades extending from the central shaft to the shroud; and
        a compression ring extending circumferentially around the shroud, the compression ring comprising:
            a radially inner surface;
            a radially outer surface located opposite the radially inner surface;
            a labyrinth seal located on the radially outer surface;
            a groove located within the radially inner surface; and
            a load ring located within the groove.

7. The compressor assembly of claim 6, wherein the compression ring has a first density and the load ring has a second density that is greater than the first density.

8. The compressor assembly of claim 6, wherein the groove and the load ring are located radially inward of the labyrinth seal.

9. The compressor assembly of claim 6, wherein the compression ring is composed of three sections including a first section, a second section, and a third section located between the first section and the second section, wherein the labyrinth seal, the groove, and the load ring are located within the first section.

10. The compressor assembly of claim 9, wherein the first section has a first average thickness and the third section has a third average thickness, and wherein the first average thickness is less than the third average thickness.

11. The compressor assembly of claim 9, wherein the third section is in contact with the compressor and the first section is not in contact with the compressor.

12. The compressor assembly of claim 6, wherein the compression ring is in an interference fit with the shroud, and
wherein the compression ring is configured to apply a radially inward compressive force along one or more portions of the radially outward surface of the shroud, the radially inward compressive force is configured to compress the shroud and the plurality of blades into the central shaft.

13. The compressor assembly of claim 6, wherein the compressor has a first tensile strength, and wherein the compression ring has a second tensile strength that is greater than the first tensile strength.

14. An electrical power generation system, comprising:
a frame;
a labyrinth seal mating ring operably attached to the frame; and
a micro-turbine alternator, comprising:
a combustion chamber;
at least one turbine driven by combustion gases from the combustion chamber;
a compressor operably connected to the combustion chamber to provide a compressed airflow thereto;
one or more shafts connecting the at least one turbine to the compressor such that rotation of the at least one turbine drives rotation of the first stage compressor and the second stage compressor; and
an electric generator disposed along the one or more shafts such that electrical power is generated via rotation of the one or more shafts,
wherein the compressor comprises
a central shaft comprising an external surface;
a shroud extending circumferentially around the central shaft, the shroud comprising a radially inward surface and a radially outward surface located opposite the radially inward surface, wherein the external surface of the central shaft and the radially inward surface of the shroud are in a facing spaced relationship forming a core flow path therebetween; and
a plurality of blades extending from the central shaft to the shroud; and
a compression ring extending circumferentially around the shroud, the compression ring comprising:
a radially inner surface;
a radially outer surface located opposite the radially inner surface;
a labyrinth seal located on the radially outer surface, the labyrinth seal being in a facing spaced relationship with the labyrinth seal mating ring defining a radial gap therebetween;
a groove located within the radially inner surface; and
a load ring located within the groove,
wherein the labyrinth seal is configured reduce the radial gap, using a centrifugal force generated by the load ring as a rotational speed of the compressor assembly increases.

15. The electrical power generation system of claim 14, wherein the compression ring has a first density and the load ring has a second density that is greater than the first density.

16. The electrical power generation system of claim 14, wherein the groove and the load ring are located radially inward of the labyrinth seal.

17. The electrical power generation system of claim 14, wherein the compression ring is composed of three sections including a first section, a second section, and a third section located between the first section and the second section, wherein the labyrinth seal, the groove, and the load ring are located within the first section.

18. The electrical power generation system of claim 17, wherein the first section has a first average thickness and the third section has a third average thickness, and wherein the first average thickness is less than the third average thickness.

19. The electrical power generation system of claim 17, wherein the third section is in contact with the compressor and the first section is not in contact with the compressor.

20. The electrical power generation system of claim 14, wherein the compression ring is in an interference fit with the shroud, and
wherein the compression ring is configured to apply a radially inward compressive force along one or more portions of the radially outward surface of the shroud, the radially inward compressive force is configured to compress the shroud and the plurality of blades into the central shaft.

* * * * *